May 16, 1967  T. GASSINO  3,319,882
TEN KEY CALCULATING MACHINE
Filed Sept. 24, 1964  5 Sheets-Sheet 1

INVENTOR.
TERESIO GASSINO
BY John Toggenburger
AGENT

May 16, 1967 T. GASSINO 3,319,882
TEN KEY CALCULATING MACHINE
Filed Sept. 24, 1964 5 Sheets-Sheet 2

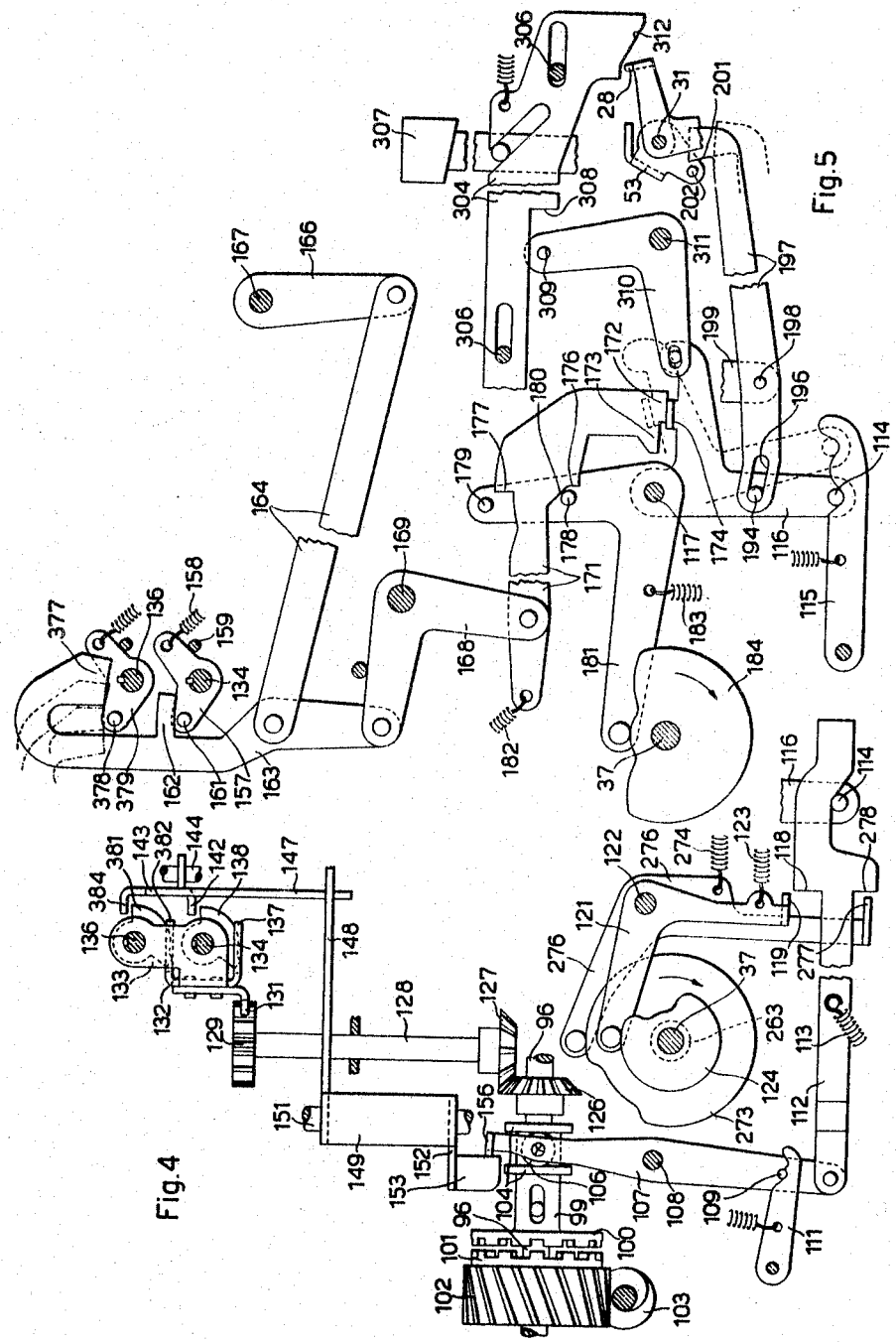

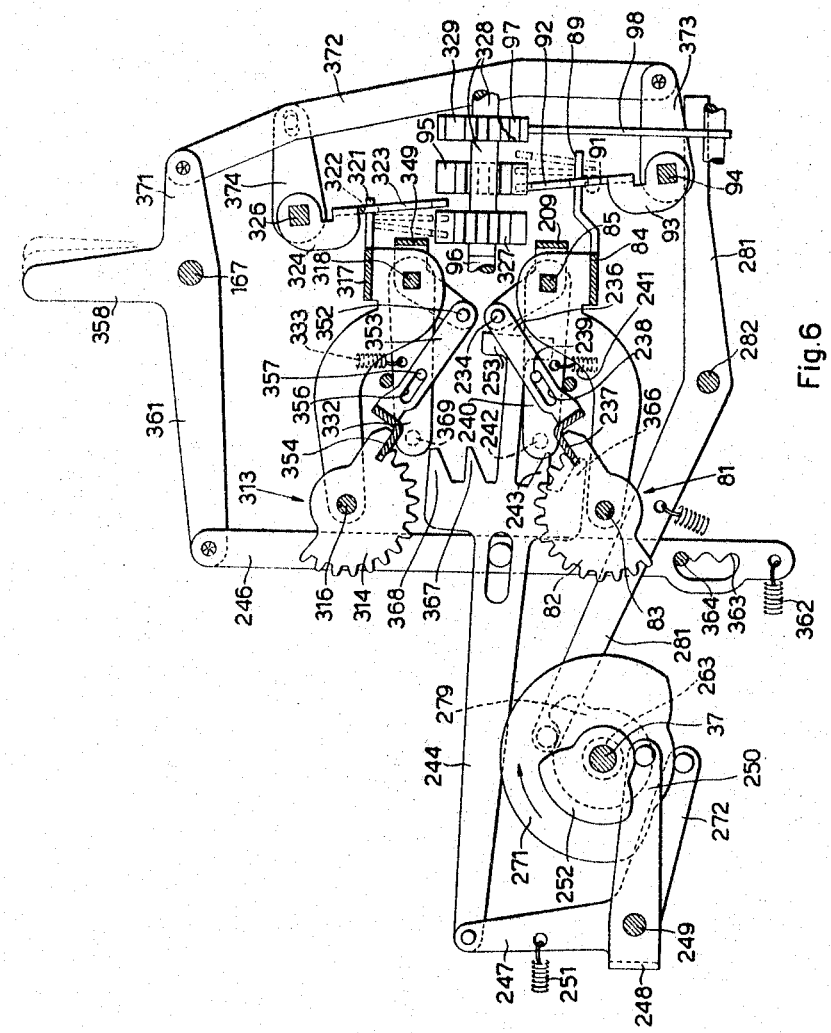

May 16, 1967 T. GASSINO 3,319,882
TEN KEY CALCULATING MACHINE
Filed Sept. 24, 1964 5 Sheets-Sheet 5

United States Patent Office 3,319,882
Patented May 16, 1967

3,319,882
TEN KEY CALCULATING MACHINE
Teresio Gassino, Ivrea, Italy, assignor to Ing. C. Olivetti & C., S.p.A., Ivrea, Italy, a corporation of Italy
Filed Sept. 24, 1964, Ser. No. 398,915
Claims priority, application Italy, Oct. 2, 1963, 20,406/63
18 Claims. (Cl. 235—60)

This invention relates to a ten key calculating machine having a multiorder indexing device, a set up device for setting said indexing device order by order and a cyclically operating mechanism for operating said set up device at the depression of each key of the ten key keyboard.

Various ten key calculating machines of the above type are already known. In a known calculating machine, if a predetermined constant amount is to be retained in the machine, it is stored in a storing device during a machine cycle, at the beginning of which the storing device is zeroized. This machine has the disadvantage that the constant amount, for example a multiplier, must be stored before a variable amount is set up, for example before a multiplicand which is usually stored in the set up indexing device of the machine, whereby the flexibility of the machine is limited.

Another known calculating machine is provided with a pair of pin carriages, one for the multiplier and the other for the multiplicand. Since after each multiplication each carriage is transversely restored and is zeroized, when a constant factor is to be retained, a constant predetermining member must be previously operated.

Finally, another known ten key calculating machine is provided with a transversely movable set up carriage having a set of sequentially settable gears, which are zeroized when the amount set up therein is accumulated in the register. When a constant amount is to be retained this machine requires the operation of a constant predetermining member.

These disadvantages are obviated by the ten key calculating machine according to the invention, which is characterized by normally effective zeroizing means operable by said mechanism for zeroizing said indexing device before operation of said set up device, said zeroizing means being adapted to be rendered ineffective after setting up the first order of an amount. It is thus clear that after the amount has been accumulated in the totalizer the zeroizing of the indexing device is not required whereby the speed thereof of the machine may be increased.

This and other characteristics of the invention will become apparent from the following description of a preferred embodiment thereof and from the accompanying drawings, wherein:

FIG. 4 is a partial sectional view of the machine taken on the line IV—IV of FIG. 2;

FIG. 5 is another left hand partial longitudinal view of the machine of FIG. 1;

FIG. 6 is a partial sectional view of the machine taken on the line VI—VI of FIG. 2;

*Set up device*

Figure 1:
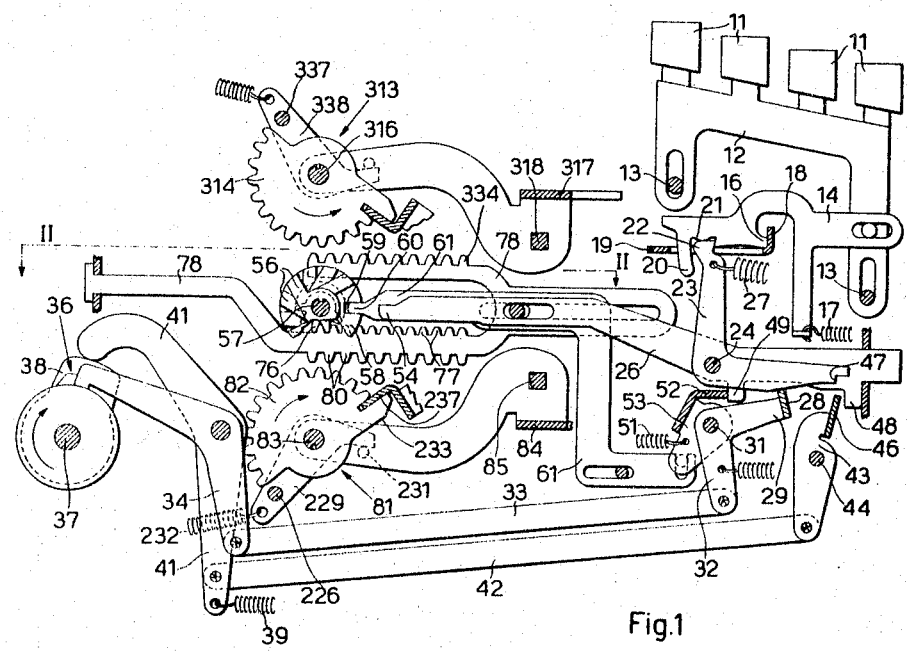
FIG. 1 is a left hand partial longitudinal sectional view of a ten key calculating machine according to the invention having two different set up carriages.

With reference to FIG. 1, the numeral 11 indicates each numeric key of a conventional ten key keyboard. Each key 11 is secured to a slide 12 vertically slidable on two stationary shafts 13 and it is pin and slot connected to a latch 14 having a projection 16 normally urged by a spring 17 to contact a bent edge 18 of a stationary comb 19. Each latch 14 is provided with a notch 21 normally engaging a projection 22 of a spring urged member or lever 23 pivoted at 24 on a corresponding slide 26.

A spring 27 urges the lever 23 clockwise and the slide 26 fowards to normally contact the machine frame by means of a projection 48.

The machine comprises a set up device having a common member formed of a shaft 57 carrying a set of stops 56 located in a variable angular position corresponding to the figure from one to nine of the corresponding key 11. The stops 56 are adapted to cooperate with a set of counterstops each one formed of a projection 54 of each slide 26. Secured to the shaft 57 is a stop formed of a disk 58 provided with a notch 59 normally engaged by a counterstop formed of a projection 60 of a slide 61, which thus locks the shaft 57 in a zero position. Furthermore, secured to the right end of the shaft 57 (upwards in FIG. 2) is a pinion 76 engaging a toothed edge 77 (FIG. 1) of a rack 78.

The machine comprises a set up operating mechanism adapted to be cyclically conditioned at the depression of each key 11 for operating the set up device. More particularly, said mechanism comprises a shaft 37 adapted to be rotated clockwise through 360 degrees by an electric motor not shown through a conventional one cycle clutch generically indicated by the numeral 36. The clutch 36 is controlled by a lever 34 connected through a link 33 to an arm 32 of a bail 29 pivoted on a stationary shaft 31 and provided with a universal bar 28 adapted to be operated by each lever 23.

Secured to the shaft 37 is a cam 38 normally contacted by a lever 41 urged counterclockwise by a spring 39. The lever 41 is connected through a link 42 to an arm 43 of a bail 46 pivoted on a stationary shaft 44. The bail 46 is adapted to cooperate with a shoulder 47 of each lever 23 and with the projection 48 of each slide 26. Fulcrumed on the shaft 31 is another bail 53 pin and slot connected with the slide 61 and provided with a bent edge 52 normally urged by a spring 51 to contact another projection 49 provided on each one of the slides 26 corresponding to the figures from one to nine only, the projection 49 of the slide 26′ (FIG. 2) corresponding to the zero figure being not embraced by the edge 52. The shaft 37 is further provided with a pair of cams 74 (FIG. 3) cooperating with a pair of rollers 73 of a lever 71 fulcrumed at 68 and normally contacted by a pin 69 of a toothed sector 67 pivoted at 68. The sector 67 is also connected to the lever 71 by a spring 72 and engages a pinion 66 secured to the left end of the shaft 57.

At the depression of one of the keys 11, the slide 12 rocks the latch 14 around the contacting point of the projection 16 with the bent edge 18. The rocked latch 14 releases the projection 22 of the corresponding lever 23, which is suddenly rocked clockwise by its spring 27. The rocked lever 23 through the universal bar 28 rocks clockwise the bail 29, which through the link 33 rocks the lever 34 clockwise, thus engaging the clutch 36 for one cycle of the shaft 37. Simultaneously the shoulder 47 of the rocked lever 23 is placed on the path of the bail 46.

At the beginning of the cycle of the shaft 37, the cam 38 causes the lever 41 to be rocked counterclockwise by the spring 39, whose action prevails over the action of the springs 27 and 51. The lever 41 through the link 42 rocks counterclockwise the bail 46 which engages the shoulder 47 of the rocked lever 23. This latter is thus moved rearwards (leftwards in FIG. 1) together with the slide 26. During this movement the projection 22 of the lever 23 engages a projection 20 of the latch 14, which brings now its projection 16 into the corresponding notch of the comb 19 and it is urged by the spring 17 to relatch the projection 22 of the lever 23 irrespective of the return movement of the key 11. The lever 23, through the bail 29 and the link 33, restores thus the lever 34 which at the end of the cycle will cause the clutch 36 to be disengaged.

The slide 26 when moved rearwards on one hand brings its projection 54 on the path of the corresponding stop 56, on the other hand by means of its projection 49 rocks the bail 53 counterclockwise. Then the bail 53 moves the slide 61 forwards thus disengaging the projection 60 from the notch 59 of the disk 58. Thereafter the pair of cams 74 (FIG. 3) rock the lever 71 counterclockwise thus causing the spring 72 to rock the sector 67, which rocks clockwise the pinion 66 together with the shaft 57, until the stop 56 (FIG. 1) corresponding to the depressed key 11 is arrested by the corresponding projection 54. The pinion 76 of the shaft 57 thus moves the rack 78 rearwards through a number of steps corresponding to the figure of the depressed key.

After the shaft 57 is arrested, the lever 71 (FIG. 3) will complete its counterclockwise rotation thus tensioning the spring 72. Now the cams 74 rock clockwise the lever 71, which restores the sector 67 together with the shaft 57 and the rack 78 (FIG. 1). Near the end of the cycle of the shaft 37, the cam 38 restores the lever 41, which through the link 42 returns the bail 46 clockwise. The bail 46 engages now the projection 48 of the slide 26, which is restored forwards. The projection 16 of the latch 14 will be disengaged from the comb 19 by the spring 17 when the depressed key 11 will be released.

When the zero key 11 is depressed, the shaft 37 effects a cycle as in the above case. Since the projection 49 of the corresponding slide 26' (FIG. 2) does not engage the bent edge 52 of the bail 53, the slide 61 is not moved forwards and the shaft 57 remains locked in its zero position.

*Set up carriage control device*

The machine comprises a multiorder indexing device adapted to be set order by order through the rack 78. More particularly, said indexing device is formed of a set up carriage, generically indicated by the numeral 81, comprising in each order a toothed sector 82 (FIG. 1) rockably mounted on a shaft 83 vertically movable on the machine frame and slidably mounting a bail 84. This latter is also axially slidable along a square shaft 85 provided with two cylindrical ends 86 (FIG. 2) rockably mounted on the machine frame. The bail 84 is urged rightwards by a spring 87 and normally locates the sector 82 of the highest order under the rack 78. The bail 84 is provided with a lug 89 engaging a slot 91 of a rack 92 (FIGS. 6 and 7) provided with two arms 93 slidably mounted on a square shaft 94. Furthermore, the machine comprises a set of actuators or racks 88 (FIGS. 2 and 8) adapted to be differentially moved under the control of the sectors 82 in an actuating cycle of a main operating mechanism comprising a hub 263 rotatably mounted on the shaft 37 and adapted to be rotated therewith in a manner to be described.

Figure 2:
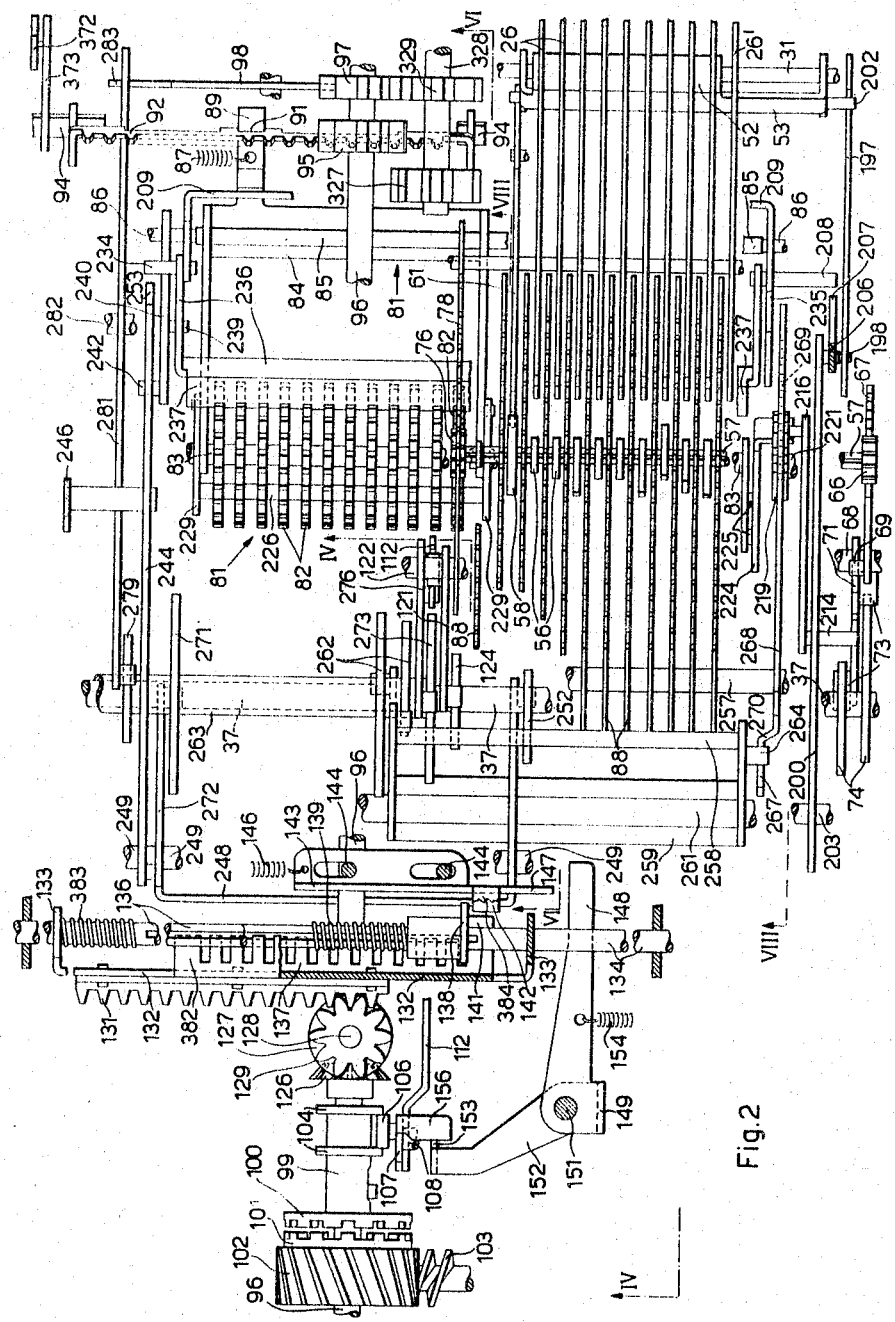
FIG. 2 is a partial plan view of the machine, taken on the line II—II of FIG. 1.

The rack 92 of the carriage 81 is adapted to be moved step by step leftwards to change the relationship between the carriage 81 and the actuators 88. In this order the rack 92 normally engages a pinion 95 secured to a longitudinal shaft 96 (FIGS. 2 and 6). Another pinion 97 secured to the shaft 96 is normally locked by a lever 98 (FIG. 7) against the urge of the spring 87. A hub 99 (FIG. 4) bodily rotatable with the shaft 96, but axially slidable thereon, is provided with a driven element 100 of a clutch, whose driving element 101 is secured to a gear 102 rotatably mounted on the shaft 96 and continuously rotated through a worm 103 by the electric motor of the machine. The hub 99 is provided with a pair of flanges 104 engaging a roller 106 of a lever 107 pivoted at 108 and provided with a pin 109 normally locked by a spring urged lever 111.

Fulcrumed on the lever 107 is also a link 112 normally urged by a spring 113 to contact a pin 114 of a control member or a lever 116 pivoted at 117 and normally located in a first angular position shown by full lines in FIG. 5 and adapted to be displaced to a second position shown by broken lines. A spring urged lever 115 normally cooperates with the pin 114 to lock the lever 116 in each one of said two positions. The link 112 (FIG. 4) is provided with a shoulder 118 adapted to be engaged by a lug 119 of a lever 121 pivoted at 122, the shoulder 118 being normally out of the path of the lug 119. The lever 121 is normally urged by a spring 123 to contact a cam 124 secured to the shaft 37.

Secured to the shaft 96 (FIGS. 2 and 4) is also a bevel gear 126 engaging a similar gear 127 secured to a vertical shaft 128 rotatably mounted on the machine frame. A pinion 129 secured to the shaft 128 normally engages a rack 131 secured to a transverse slide 132 having two bored lugs 133 slidably mounted on two parallel shafts 134 and 136 rockable on the machine frame. The slide 132 is provided with a bent edge 137 toothed according to the transverse distance of the sectors 82 on the set up carriage 81 and it is adapted to be engaged by a control element or sector 138 (FIG. 4) slidably mounted on the shaft 134 and bodily rockable therewith. The sector 138 is urged leftwards (downwards in FIG. 2) by a compression spring 139 and normally contacts a projection 141 of the toothed edge 137. The sector 138 is further adapted to cooperate with a lug 142 of a slide 143 slidably mounted on a pair of stationary pins 144. The slide 143 is normally urged rightwards by a spring 146 and it is provided with a projection 147 adapted to engage an arm 148 of a bail 149 fulcrumed on a vertical shaft 151. Another arm 152 of the bail 149 is provided with a lug 153 normally urged by a spring 154 to contact a lug 156 of the lever 107.

Secured to the shaft 134 is also an arm 157 (FIG. 5) urged by a spring 158 to contact a stationary member 159 and provided with a pin 161 adapted to cooperate with a projection 162 of a plate 163 connected to a link 164 and to a lever 168 fulcrumed at 169. The link 164 is further connected to a lever 166 secured to a shaft 167 rotatably mounted on the machine frame, whereas the lever 168 is connected to a link 171 urged by a spring 182 to contact, through one of a pair of steps 172 and 173, a lug 174 of the lever 116. The link 171 is further provided with a pair of shoulders 176 and 177 alternately adapted to cooperate with a pair of pins 178 and 179 of a lever 181 fulcrumed at 117 and urged by a spring 183 to contact a cam 184 of the shaft 37. The pin 178 is further adapted to cooperate with a tapered edge 180 of the link 171. Normally the step 172 contacts the lug 174 and the shoulder 176 is located in front of the pin 178.

An intermediate member or link 197 (FIG. 3) linked at 198 to a projection 199 of a horizontal slide 200 is connected through a slot 196 (FIG. 5) with a pin 194 of the lever 116 and it is provided with a hooked end 201 normally located on the path of a pin 202 of the bail 53. The slide 200 (FIG. 3) is slidably mounted on two stationary pins 203 and is normally urged rearwards by a spring 204. The slide 200 is provided with a pair of pins 205 slidably mounting a vertical slide 206 having a projection 207 adapted to cooperate with a pin 208 of a bail 209 rotatably mounted on the cylindrical ends 86 of the shaft 85 and normally urged by a spring 212 to contact a stationary pin 211. Furthermore, the slide 200 is provided with a cam slot 213 cooperating with a pin 214 of a link 216. The pin 214 is adapted to be engaged by a projection 217 of the lever 71, but it is normally located out of the path of said projection.

The link 216 is linked at 218 to a toothed sector 219 fulcrumed on a stationary pivot 221 and provided with a shoulder 222 adapted to be engaged by a lug 223 of a slide 224 slidably mounted on a pair of pins 225 of a lever 227 secured to the shaft 83. A spring 228 tensioned between the slide 224 and the lever 227 urges the slide 224 downwards, whereby the lug 223 normally disengages the shoulder 222. Axially slidable on the shaft 83 but bodily rockable therewith are also two arms 229 (FIGS. 1 and 2) carrying a universal bar 226 adapted to engage a projection 233 (FIG. 1) of each sector 82 for zeroizing same. A spring 232 normally urges each arm 229 to contact a corresponding pin 231 secured to the bail 84.

The lug 223 (FIG. 3) of the slide 224 is also adapted to be engaged by an arm 235 of the bail 209. Pivoted on the pin 208 and on another pin 234 (FIG. 6) of the bail 209 is a bail 236 having a transverse bent edge 237 normally locking the sectors 82 in their angular position. A slot 238 of the bail 236 is entered by a pin 239 of an arm 240 secured to the shaft 85 and normally urged by a spring 241 to contact a stationary pin. The arm 240 is provided with another pin 242 adapted to cooperate with a projection 243 of a slide 244 pin and slot connected with a vertical link 246 and pivoted on an arm 247 of a bail 248 fulcrumed at 249. The bail 248 is provided with another arm 250 urged by a spring 251 to contact a cam 252 of the shaft 37. The slide 244 is also provided with a projection 253 adapted to engage the pin 234 of the bail 209.

As it will be more clearly disclosed later, at the end of an actuating cycle of the hub 263, the carriage 81 is restored rightwards in the position of FIG. 2, whereas the sectors 82 remain variably rocked clockwise from the zero position shown in FIG. 1 according to the various figures of the amount stored therein. The slide 132 (FIG. 2) is also restored rightwards, whereas the sector 138 is returned to the angular position of FIG. 4 and remains engaged with the toothed edge 137 in a transverse position corresponding to the previous transverse position of the carriage 81, that is the sector 138 remains displaced rightwards with respect to the position shown in FIG. 2, a number of steps corresponding to the number of orders of the amount stored in the carriage 81. Therefore, before setting up a new amount the sectors 82 must be zeroized and the sector 138 must be returned leftwards in the axial position of FIG. 2.

As it has been disclosed before, at the depression of each numeric key 11 (FIG. 1) the shaft 37 is caused to rotate clockwise for a set up cycle. At the beginning of said cycle the slide 26 corresponding to the depressed key is displaced rearwards and, in the case the depressed key is not the zero key, the displaced slide 26 rocks the bail 53 counterclockwise. Then the pin 202 (FIG. 3) of the bail 53 displaces the link 197 forwards together with the horizontal slide 200 and the vertical slide 206. The cam slot 213 of the slide 200 places then the pin 214 on the path of the projection 217 of the lever 71. Simultaneously, the projection 207 of the slide 206 engages the pin 208, thus rocking the bail 209 clockwise. The arm 235 of the bail 209 engages the lug 223 of the slide 224 which is thus placed on the path of the shoulder 222 of the sector 219. Furthermore, the pins 208 and 234 (FIG. 6) of the bail 209 cause the bail 236 to disengage the bent edge 237 from the sectors 82.

When the pair of cams 74 (FIG. 3) rock the lever 71 counterclockwise, its projection 217 engages the pin 214 and through the link 216 rocks the sector 219 counterclockwise. The shoulder 222 of the sector 219 engages now the lug 223 of the slide 224, whereby the lever 227 is rocked counterclockwise together with the shaft 83, the arms 229 (FIG. 1) and the universal bar 226. This latter in turn engages the projection 233 of each sector 82 and zeroizes the previous amount stored in the carriage 81 before operation of the set up device.

The link 197 (FIG. 5) when displaced forwards rocks also the lever 116 counterclockwise to its second position shown by broken lines. Then the pin 114 of the lever 116 displaces the link 112 (FIG. 4) upwards and locates the shoulder 118 on the path of the lug 119 of the lever 121. Furthermore, the lug 174 (FIG. 5) of the lever 116 displaces the link 171 upwards to locate the shoulder 177 in front of the pin 179 of the lever 181.

Thereafter the cam 184 rocks clockwise the lever 181, whose pin 179 displaces the link 171 forwards through its maximum extent. The link 171 through the lever 168 displaces downwards the plate 163, whose projection 162 engages the pin 161 and rocks counterclockwise the arm 157 together with the shaft 134 and the sector 138 (FIG. 4). This sector disengages now the toothed edge 137 of the slide 132 and is suddenly moved leftwards by the spring 139 (FIG. 2) until arrested by the projection 141, as shown in FIG. 2, to zeroize the record of the number of orders of the previous amount stored in the carriage 81. The link 171 (FIG. 5) when displaced forwards disengages the shoulder 172 from the lug 174, while the spring 182 causes the shoulder 173 of the link 171 to contact the same lug 174. However the shoulder 177 of the link 171 remains on the path of the pin 179 of the lever 181.

Figure 3:
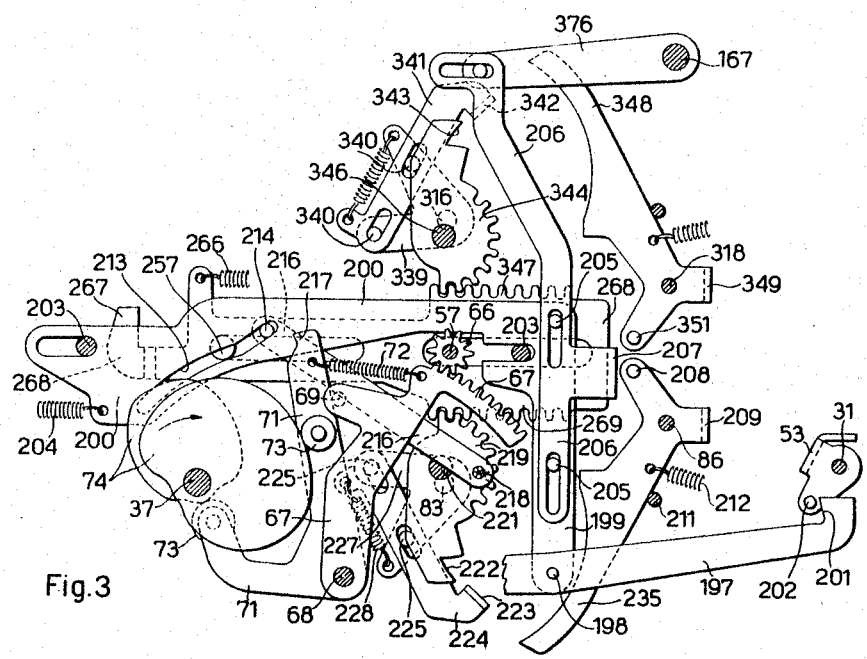
FIG. 3 is a left hand partial longitudinal view of the machine of FIG. 1.

During the zeroizing movement of the sectors 82 (FIG. 1) and the leftward movement of the sector 138 (FIG. 2) the rack 78 is moved rearwards according to the depressed key. Thereafter the cam 252 (FIG. 6) of the shaft 37 rocks clockwise the bail 248, which moves the slide 244 forwards. The projection 243 of the slide 244 engages now the pin 242 thus rocking the arm 240 clockwise together with the shaft 85, whereby the sector 82 of the highest order engages a toothed edge 80 (FIG. 1) of the rack 78. Furthermore, the projection 253 (FIG. 6) of the slide 244 engages the pin 234 of the bail 209, thus holding the bent edge 237 disengaged from the sectors 82 during the engagement with the rack 78 irrespective of the projection 207 (FIG. 3). The rack 78 (FIG. 1) is now returned forwards and rocks the engaged sector 82 clockwise according to the depressed key.

In turn the bail 53 is restored by the spring 51, whereby its pin 202 (FIG. 5) disengages the end 201 of the link 197. Now the spring 204 (FIG. 3) restores the slide 200 rearwards, and the link 197 is caused by the pin 194 of the lever 116 to locate its end 201 out of the path of the pin 202. It is thus clear that the intermediate member is connected to the control member 116 in such a manner as to enable said intermediate member during its operation to displace said control member from its first to its second position and to enable said control member when so displaced to render said intermediate member ineffective. Therefore, in the following set up cycles for the other orders of the new amount the link 197 will not be affected by the bail 53 until the lever 116 will remain in the rocked position.

Thereafter the cam 252 (FIG. 6) causes the spring 251 to restore the bail 248, and the slide 244 rearwards, whereby the spring 241 returns counterclockwise the arm 240 together with the carriage 81, and the sector 82 is disengaged from the rack 78 (FIG. 1). Simultaneously the cam 184 (FIG. 5) causes the spring 183 to return the lever 181 counterclockwise. The spring 182 returns now the link 171 rearwards until its shoulder 172 is frontally arrested by the lug 174. The plate 163 thus causes the sector 138 (FIG. 4) to return clockwise to a first angular location, intermediate between the location shown in FIG. 4 and the counterclockwise location. In this first angular location the sector 138 reengages the toothed edge 137 and is adapted to transversely engage the lug 142 of the slide 143.

Figure 7:
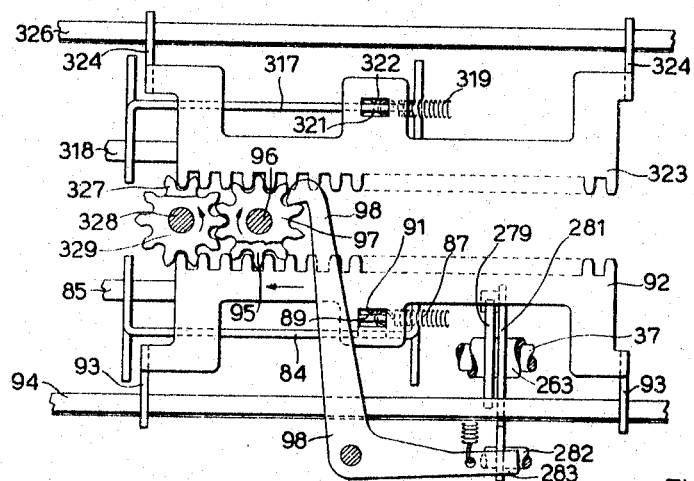
FIG. 7 is a partial front view of the machine of FIG. 1.

Near the end of the set up cycle the cam 124 causes the lever 121 to be rocked counterclockwise by the spring 123, whereby the lug 119 displaces forwards the link 112, the spring 123 prevailing over the spring 113. The link 112 in turn rocks the lever 107 counterclockwise thus engaging the clutch 100, 101. The shaft 96 is now rotated clockwise (FIG. 7), while the lever 107 (FIG. 4) is locked in the rocked position by the lever 111. The shaft 96 on one hand through the pinion 95 (FIG. 2) and the rack 92 shifts the bail 84 leftwards together with the carriage 81, on the other hand through the gears 126 and 127 (FIG. 4), the shaft 128 and the pinion 129, moves leftwards the rack 131 (FIG. 2) together with the slide 132, the sector 138 and the slide 143. The projection 147 of slide 143 engages now the arm 148 of the bail 149, which by means of the lug 153 returns the lever 107 clockwise (FIG. 4). The clutch 100, 101 is thus disengaged after one step of the carriage 81, which locates now the second sector 82 (FIG. 2) under the rack 78 and it is locked in the reached position by the lever 98 (FIG. 7).

At the end of the first set up cycle, since the lever 116 (FIG. 5) remains rocked counterclockwise in its second position, the link 171 remains with the shoulder 172 frontally arrested by the lug 174, and the sector 138 (FIG. 4) remains in its first angular location. When one of the keys 11 (FIG. 1) is depressed to set up the new set up cycle. However, since the link 197 (FIG. 3) disengages now the pin 202 of the bail 53, the slide 200 is not moved forwards and the lever 71 cannot engage the pin 214. It is thus clear that the zeroizing means 226 (FIG. 1) are rendered ineffective after setting up the first order of an amount.

During each set up cycle following the set up cycle of the first order, when the cam 184 (FIG. 5) rocks the lever 181 clockwise, the link 171 is displaced again forwards by the pin 179 and temporarily disengages the sector 138 (FIG. 4) from the toothed edge 137. The spring 146 (FIG. 2) prevailing over the spring 139 returns now the slide 143 in the transverse position of FIG. 2, thus moving the sector 138 rightwards in front of the next following notch of the toothed edge 137. When the cam 184 (FIG. 5) causes the lever 181 to release the link 171, the sector 138 (FIG. 4) engages the toothed edge 137 in said next following notch, whereby the step by step movement of the carriage 81 (FIG. 1) and the other functions of the set up cycle are effected in a manner similar to the above described first set up cycle.

It is to be noted that in the case the zero key 11 is accidentally depressed when the first order of an amount is to be set up, the shaft 37 effects a set up cycle, which does not affect the carriage 81. In fact, since the corresponding slide 26' (FIG. 2) is unable to rock the bail 53, the link 197 is not displaced forwards and the sectors 82 are not zeroized. Furthermore, since the lever 116 remains in the position of FIG. 5, the link 171 is displaced forwards by the pin 178 of the lever 181 through half a stroke controlled by the pin 179. Therefore, the link 171 is unable to disengage the sector 138 from the toothed edge 137 (FIG. 4), whereby the sector 138 remains in the transverse position corresponding to the number of orders set up on the sectors 82. Finally, the link 112 remains in the lower position wherein the shoulder 118 is out of the path of the lug 119, whereby the clutch 100, 101 is not engaged and the carriage 81 is not shifted leftwards.

*Actuating device*

The amount set up on the carriage 81 may be accumulated into a totalizer generically indicated by the numeral 256 (FIG. 8) and adapted to be engaged with the racks 88 in a manner known per se. The racks 88 are located at left of the rack 78 (FIG. 2) and are slidably mounted on a stationary shaft 257 and on the shaft 57, wherein they are interspersed with the stops 56.

Secured to the hub 263 (FIG. 8) are a pair of cams 262 cooperating with a bail 259 fulcrumed on a stationary shaft 261 and carrying a universal bar 258 controlling the racks 88. The bail 259 is also provided with a pin 264 cooperating with a projection 267 of a slide 268 slidably mounted on the shafts 57 and 257 (FIG. 3). The slide 268 is normally urged forwards by a spring 266 and it is provided with a toothed edge 269 engaging the sector 219. The slide 268 is bent at 270 (FIG. 2) so as to be displaced rearwards by the sector 219 without affecting the pin 264. Another cam 271 (FIG. 6) of the hub 263 is adapted to cooperate with an arm 272 of the bail 248. A further cam 273 (FIG. 4) of the hub 263 cooperates with a lever 276 pivoted at 122 and urged counterclockwise by a spring 274. The lever 276 is provided with a lug adapted to cooperate with a second shoulder 278 of the link 112. Still another cam 279 (FIG. 6) of the hub 263 cooperates with a lever 281 pivoted at 282 and adapted to cooperate with a projection 283 (FIG. 7) of the lever 98.

Slidably mounted on two stationary pins 306 (FIG. 5) is a slide 304 adapted to be shifted rearwards at the depression of a set of motor or actuating keys, for example an adding key 307. The slide 304 when shifted rearwards is adapted to cause the hub 263 (FIG. 4) to be secured to the shaft 37 in a known manner. Furthermore, the slide 304 (FIG. 5) is provided with a tapered edge 312 adapted to engage the universal bar 28 to condition the shaft 37 for effecting together with the hub 263 one cycle, which will be called actuating cycle. Finally, the slide 304 is provided with a shoulder 308 adapted to cooperate with a pin 309 of a lever 310 pivoted at 311 and pin and slot connected with the lever 116. Particularly, when the lever 116 is located in the second position shown by broken lines in FIG. 5, the pin 309 is located close to the shoulder 308.

Assuming that a new amount has been set up on the carriage 81, the lever 116 is located in its second position, At the depression of the key 307 the slide 304 is shifted rearwards, thus restoring through the shoulder 308 and pin 309, the lever 310 counterclockwise and returning the lever 116 in its first position shown in FIG. 5. All the machine functions controlled by the lever 116 during each set up cycle are thus prevented. More particularly, the link 171 follows the lug 174 and locates its shoulder 177 out of the path of the pin 179 and the tapered edge 180 on the path of the pin 178. Furthermore, the projection 201 of the link 197 returns on the path of the pin 202, while the link 112 (FIG. 4) replaces the shoulder 278 on the path of the lug 277. Finally, the slide 304 causes the hub 263 to be secured to the shaft 37 and through the tapered edge 312 (FIG. 5) and the universal bar 28 causes the clutch 36 (FIG. 1) to rotate the shaft 37 together with the hub 263 (FIG. 4) for an actuating cycle. It is thus clear that the control member 116 is returned to its first position shown in FIG. 5 by the slide 304, which is operated concomitantly with the main operating mechanism 263.

At the beginning of the actuating cycle the cam 273 temporarily releases the lever 276. However, since the lever 107 is held in the position of FIG. 4 by the sector 138, through the slide 147 and the bail 149, and since the slide 132 is positively locked by the lever 98 (FIG. 7), through the shafts 96 and 128 (FIG. 4), the lever 276 is prevented from being rocked counterclockwise, and the clutch 100, 101 is not engaged. Thereafter the cam 184 (FIG. 5) rocks the lever 181 clockwise and the pin 178 engages at first the tapered edge 180 of the link 171, which is thus displaced upwards to unlatch the shoulder 172 from the lug 174. Then the pin 178 engages the shoulder 176 of the link 171 which is moved forwards through half a stroke controlled by the pin 179 in the set up cycle, whereby the sector 138 (FIG. 4) is not disengaged from the toothed edge 137, and therefore the clutch 100, 101 cannot be engaged by the lever 276. Simultaneously, the cam 271 (FIG. 6) through the bail 248 and the slide 244 engages the sectors 82 with the racks 88

Figure 8:
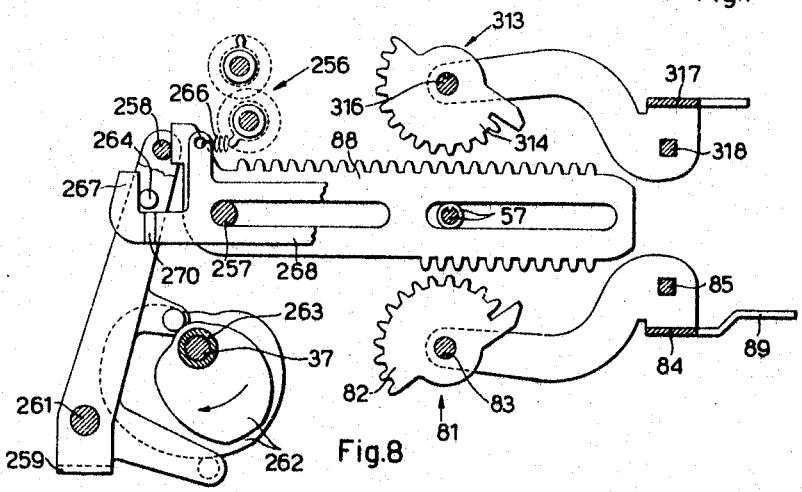
FIG. 8 is a partial sectional view of the machine taken on the line VIII—VIII of FIG. 2.

(FIG. 8). The projection 253 (FIG. 6), of the slide 244 in turn engages the pin 234 thus rocking the bail 209 clockwise, whereby on one hand the bent edge 237 releases the sectors 82, on the other hand the arm 235 (FIG. 3) places the lug 223 of the slide 224 on the path of the shoulder 222 of the sector 219.

The cams 262 (FIG. 8) rock now the bail 259 counterclockwise, whereby the universal bar 258 releases the racks 88, while the pin 264 moves the slide 268 rearwards. The sector 219 (FIG. 3) is now rocked counterclockwise by the slide 268 and through the slide 224 rocks counterclockwise the lever 227 together with the shaft 83, the arms 229 and the universal bar 226 (FIG. 1).

This latter engages the projection 233 of the various sectors 82 which are thus zeroized and positively move the corresponding racks 88 (FIG. 8) differentially rearwards. Thereafter the bail 259 is returned clockwise by the cams 262, whereby the pin 264 causes the slide 268 to be restored by the spring 266 together with the sector 219 (FIG. 3) and the universal bar 226 (FIG. 1). Simultaneously the universal bar 258 (FIG. 8) positively restores the racks 88 forwards, whereby the sectors 82 return in the angular positions corresponding to the amount set up therein.

It is thus clear that both the rearward and the forward stroke of the racks 88 are effected positively, whereby the amount may be accumulated in the totalizer 256 during the rearward stroke of the racks 88, and the tens transfer is effected during the forward stroke thereof.

Near the end of the cycle the cam 271 (FIG. 6), through the bail 248 and the slide 244, causes the sectors 82 to disengage the racks 88 (FIG. 8) and to be locked by the bent edge 237 (FIG. 6). The cam 184 (FIG. 5) in turn causes the lever 181 to be restored, together with the link 171 in the position of FIG. 5, whereby the sector 138 is returned to a second angular location as shown in FIG. 4. Simultaneously the cam 279 (FIG. 6) rocks the lever 281 clockwise, thus disengaging the lever 98 (FIG. 7) from the pinion 97. The spring 87 returns now the carriage 81 (FIG. 2) rightwards and through the rack 92, pinion 95, shafts 96 and 128, and pinion 129, returns rightwards the slide 132. The sector 138 is thus displaced rightwards a number of steps equal to the number of orders of the amount set up in the sectors 82, thus recording the previous transverse position of the carriage 81.

In the case a number of repeated adding or subtracting cycles are to be effected the rightwards restorations of the carriage 81 may be prevented in a known manner. On the contrary, in the case the carriage 81 has been returned rightwards and the amount set up in the sectors 82 is desired to be processed again in an actuating cycle, the corresponding motor key, for example the same key 307 (FIG. 5), may be depressed without other controls. In this case at the beginning of the actuating cycle of the shaft 37 and the hub 263 (FIG. 4) caused by the depressed key, the spring 274 prevailing over the spring 113, rocks the lever 276 and through the link 112 and the lever 107 engages the clutch 100, 101. The carriage 81 (FIG. 2) is now tabulated leftwards together with the rack 92, the slide 132 and the sector 138. Since this latter is simultaneously rocked clockwise to its first location, it encounters the lug 142 of the slide 143, which is moved leftwards and disengages the clutch 100, 101. The carriage 81 resumes thus the previous transverse position, whereby the actuating cycle may be effected in a similar manner as the already described first actuating cycle.

*Second set up carriage and carriage selecting device*

The machine is provided with a second set up carriage 313 (FIG. 1) comprising a set of sectors 314 rotatable on a shaft 316 vertically movable on the machine frame and slidably mounting a bail 317. The carriages 81 and 313 are mounted symmetrically at the opposite side of the racks 78 and 88 with respect to the reciprocating direction thereof. The bail 317 is also axially slidable on a square shaft 318 rotatably mounted on the machine frame and is urged rightwards by a spring 319 (FIG. 7). A lug of the bail 317 engages a slot 322 of a rack 323 having a pair of lugs 324 slidably mounted on a second square shaft 326. The rack 323 is adapted to engage a pinion 327 (FIG. 6) secured to a shaft 328, but it is normally disengaged therefrom. Another pinion 329 secured to the shaft 218 meshes with the pinion 97 (FIG. 2), whereby the pinion 327 is always rocked synchronously with the pinion 95, but in opposite direction.

Secured to the shaft 318 (FIG. 6) is an arm 332 normally urged by a spring 333 to contact a stationary pin and operable to engage the sectors 314 with a toothed edge 334 (FIG. 1) of the rack 78 and with the racks 88 (FIG. 8). The sectors 314 may be zeroized by a universal bar 337 (FIG. 1) carried by two arms 338 axially slidable on the shaft 316 and bodily rockable therewith. A lever 339 (FIG. 3) secured to the shaft 316 is provided with a pair of pins 340 slidably mounting a slide 341 provided with a lug 342 adapted to engage a shoulder 343 of a sector 344 fulcrumed on a stationary pin 346 and normally engaging a second toothed edge 347 of the slide 268. The lug 342 is further adapted to be engaged by an arm 348 of a bail 349 fulcrumed on the shaft 318. Pivoted on two pins 351 and 352 (FIG. 6) of the bail 349 is a bail 353 having a bent edge 354 normally locking the sectors 314, and a slot 356 slidable on a pin 357 of the arm 332. The pin 352 of the bail 349 is engageable by the projection 253 of the slide 244, whereas the pin 351 is engageable by the projection 207 (FIG. 3) of the slide 206, but said pins are normally out of the path of said projections.

The two carriages 81 and 313 (FIG. 6) are selectable for the set up cycles as well as for the actuating cycles by selecting means comprising a lever 358 secured to the shaft 167 and provided with an arm 361 connected to the link 246. A toothed slot 363 of the link 246 is urged by a spring 362 to cooperate with a stationary pin 364. The slide 244 is provided with a further projection 366 adapted to cooperate with the pin 242 of the arm 240 and with two projections 367 and 368 adapted to cooperate with a pin 369 of the arm 332. A second arm 371 of the lever 358 is connected to a link 372 linked to an arm 373 secured to the shaft 94. The link 372 is also pin and slot connected to a similar arm 374 secured to the shaft 326. Another lever 376 (FIG. 3) secured to the shaft 167 is pin and slot connected to the slide 206. The plate 163 (FIG. 5) in turn is provided with a second projection 377 adapted to cooperate with a pin 378 of an arm 379 secured to the shaft 136. A second control element or sector 381 (FIG. 4) associated with the carriage 313 is axially shiftable and bodily rockable with the shaft 136 and normally engages a second toothed edge 382 of the slide 132. The sector 381 is urged leftwards by a compression spring 383 (FIG. 2) and is adapted to cooperate with a second lug 384 of the slide 143.

When the lever 358 is located in the counterclockwise position shown in FIG. 6, the set up cycles as well as the actuating cycles are effected on the carriage 81 in the above described manner. When the lever 358 is rocked in the clockwise position shown by dot and dash lines in FIG. 6, the arm 376 (FIG. 3) moves the slide 206 upwards to locate the projection 207 in front of the pin 351. In the set up cycle of the first order of an amount, when the link 197 displaces the slide 200 forwards, the projection 207 of the slide 206 rocks the bail 349, which on one hand locates the lug 342 on the path of the shoulder 343 of the sector 344, on the other hand causes the bent edge 354 (FIG. 6) to disengage the sectors 314. Thereafter, when the lever 71 (FIG. 3) moves the link 216 rearwards, the sector 344 causes the universal bar 337 (FIG. 1) to zeroize the sectors 314.

Furthermore, the slide 244 (FIG. 6), which has been raised by the link 246 to locate the projection 367 in front of the pin 369, causes the arm 332 to be rocked counterclockwise to engage the sectors 314 with the racks 78 and 88, while the projection 253 of the slide 244, which is now located in front of the pin 352, holds the bail 349 rocked. In the set up cycles the various orders of the amounts are now set up in the sectors 314, whereas in the actuating cycles the actuators 88 are controlled by the sectors 314 instead of the sectors 82.

Finally, the arm 371 of the lever 358, through the link 372, rocks the arms 373 and 374 clockwise, whereby the rack 92 is disengaged from the pinion 95, while the rack 323 is engaged with the pinion 327. The arm 166 (FIG. 5) in turn through the link 164 displaces the plate 163 in a manner as to locate the projection 377 over the pin 378 and the projection 162 rearwards the pin 161. The transverse movement of the slide 132 (FIG. 4) is now controlled by the sector 381 instead of the sector 138, the carriage 313 (FIG. 6) being moved therewith by means of the pinion 327 and the rack 323. It is to be noted that the sector 138 or 381 which remains in the angular position of FIG. 4 is transversely bodily moved with the slide 132, thus maintaining the record of the number of orders set up in the corresponding carriage.

When the lever 358 (FIG. 6) is located in its intermediate position shown by broken lines, the slide 206 (FIG. 3) places its projection 207 in front of both the pins 208 and 351. In turn the slide 244 (FIG. 6) places the projection 253 in front of both the pins 234 and 352, the projection 366 in front of the pin 242 and the projection 368 in front of the pin 369. Similarly the link 372 through the arms 373 and 374 simultaneously engages the rack 92 with the pinion 95 and the rack 323 with the pinion 327. Finally, the plate 163 (FIG. 5) is located in an intermediate position, wherein both the projections 162 and 377 are located over the corresponding pins 161 and 378 respectively. An amount set up through the keyboard is now simultaneously stored in both the carriages 81 and 313.

It is intended that various modifications, improvements and additions of parts may be made to the above described calculating machine, without departing from the scope of the invention.

What I claim is:

1. In a calculating machine having a ten key keyboard, and a multiorder indexing device adapted to be set order by order under the control of said keyboard, the combination comprising:
   (a) a set up device controlled by each key of said keyboard and operable for setting up each order of said indexing device,
   (b) transversely traveling means for step by step changing the relationship between said indexing device and set up device upon setting up each one of said orders,
   (c) an operating mechanism adapted to be cyclically conditioned at the depression of each key of said keyboard for operating said set up device,
   (d) normally effective zeroizing means operable by said mechanism for zeroizing all the orders of said indexing device before operation of said set up device,
   (e) and means for rendering said zeroizing means ineffective upon setting up the first order of an amount,
   (f) and means operable upon processing the amount so set up for restoring said zeroizing means to their effective condition.

2. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:
   (a) a set up device controlled by each key of said keyboard and operable for setting up each order of said indexing device,
   (b) transversely traveling means for step by step changing the relationship between said indexing device and said set up device upon setting up each one of said orders,
   (c) a set up operating mechanism adapted to be cyclically conditioned at the depression of each key of said keyboard for operating said set up device,
   (d) zeroizing means operable by said set up mechanism for zeroizing all the orders of said indexing device before operation of said set up device,
   (e) and means for rendering said zeroizing means effective when an operation of said main mechanism is effected and for rendering same ineffective when an operation of said set up device is effected.

3. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:
   (a) a set up device controlled by each key of said keyboard and operable for setting up each order of said indexing device,
   (b) transversely traveling means for step by step changing the relationship between said indexing device and said set up device upon setting up each one of said orders,
   (c) a set up operating mechanism adapted to be cyclically conditioned at the depression of each key of said keyboard for operating said set up device,
   (d) zeroizing means operable by said set up mechanism for zeroizing all the orders of said indexing device before operation of said set up device,
   (e) a control member for said zeroizing means, said control member being normally located in a first position wherein said zeroizing means are rendered effective for operation,
   (f) means operable by said set up device for displacing said control member from said first position to a second position wherein said zeroizing means are rendered ineffective,
   (g) and means operable concomitantly with said main mechanism for returning said control member to said first position.

4. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:
   (a) a set up device controlled by each key of said keyboard and operable for setting up each order of said indexing device,
   (b) transversely traveling means for step by step changing the relationship between said indexing device and said set up device upon setting up each one of said orders,
   (c) a set up operating mechanism adapted to be cyclically conditioned at the depression of each key of said keyboard for operating said set up device,
   (d) zeroizing means operable by said set up mechanism for zeroizing all the orders of said indexing device before operation of said set up device,
   (e) a control member for said zeroizing means, said control member being normally located in a first position wherein said zeroizing means are rendered effective for operation,
   (f) an intermediate member normally effective for being operated by said set up device,
   (g) means for connecting said intermediate member to said control member in such a manner as to enable said intermediate member during its operation to displace said control member from said first to said second position and to enable said control member when so displaced to render said intermediate member ineffective, (h) and means operable concomitantly with said main mechanism for returning said control member to said first position.

5. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:

(a) a set up device controlled by each key of said keyboard and operable for setting up each order of said indexing device, (b) a set up operating mechanism adapted to be cyclically conditioned at the depression of each key of said keyboard for operating said set up device, (c) transversely traveling means for step by step changing the relationship between said indexing device and said set of actuators, (d) a toothed member connected to said traveling means, (e) a control element adapted to engage variably said toothed member according to the transverse position of said traveling means, (f) zeroizing means operable by said set up mechanism for zeroizing all the orders of said indexing device before operation of said set up device, (g) disengaging means operable by said set up mechanism for disengaging said control element from said toothed member, (h) and means for rendering said zeroizing means effective when an operation of said main mechanism is effected and for rendering same ineffective when an operation of said set up device is effected.

6. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:

(a) a set up device controlled by each key of said keyboard and operable for setting up each order of said indexing device, (b) a set up operating mechanism adapted to be cyclically conditioned at the depression of each key of said keyboard for operating said set up device, (c) transversely traveling means for step by step changing the relationship between said indexing device and said set of actuators, (d) yieldable means urging said traveling means toward their rest position, (e) a locking member normally effective for locking said traveling means against the urge of said yieldable means, (f) a control element adapted to engage variably a toothed member according to the transverse position of said traveling means, (g) a power operable clutch adapted to be engaged by said set up mechanism for advancing said traveling means against the urge of said yieldable means, (h) means operated by said set up mechanism for temporarily moving said control element perpendicular to the advancing direction of said toothed member to disengage said toothed member simultaneously with the engagement of said clutch, (i) return means for returning said control element in engagement with said toothed member to one of a pair of locations, (j) a moving member operable for disengaging said clutch when said control element is returned to a first location of said pair, (k) zeroizing means operable by said set up mechanism for zeroizing all the orders of said indexing device before operation of said set up device, (l) a control member normally located in a first position wherein said zeroizing means are rendered effective for operation and said return means are caused to return said control element to a second location of said pair, (m) means operated by said set up device for displacing said control member from said first position to a second position wherein said zeroizing means are rendered ineffective and said return means are caused to return said control element to said first location, (n) means operable concomitantly with said main mechanism for returning said control member to said first position, (o) and means operated by said main mechanism for disabling said locking member, whereby said traveling means are returned to their rest position, whereas said control element remains in said second location to record the previous transverse position of said traveling means.

7. In a calculating machine according to claim 6, (p) means operable by said main mechanism for engaging said clutch before conditioning said actuators, (q) and means operable by said main mechanism for moving said control element to said first location when it engages said clutch, whereby in an operation of said main mechanism subsequent to a previous operation said traveling means may resume said previous transverse position and said actuators may be controlled repeatedly by said indexing device.

8. In a calculating machine having a ten key keyboard, and a multiorder indexing device adapted to be set order by order under the control of said keyboard, the combination comprising:

(a) a set up device controlled by each key of said keyboard and operable for setting up each order of said indexing device, (b) an operating mechanism cyclically conditionable for operating said set up device, (c) a spring urged member associated with each key of said keyboard and adapted to condition said mechanism, (d) a latch connected to said key for normally latching said spring urged member in an ineffective position, said latch being adapted to release said spring urged member at the depression of said key, (e) and means operable by said mechanism for restoring said spring urged member and for causing said latch to relatch said spring urged member so restored irrespective of the return movement of said key.

9. In a calculating machine having a ten key keyboard, and a multiorder indexing device adapted to be set order by order under the control of said keyboard, the combination comprising:

(a) a set up device controlled by each key of said keyboard and operable for setting up each order of said indexing device, (b) transversely traveling means for step by step changing the relationship between said indexing device and set up device upon setting up each one of said orders, (c) an operating mechanism cyclically conditionable for operating said set up device, (d) a spring urged member associated with each key of said keyboard and adapted to condition said mechanism, (e) a latch connected to said key for normally latching said spring urged member in an ineffective position, said latch being adapted to release said spring urged member at the depression of said key, (f) normally effective zeroizing means operable by said mechanism for zeroizing all the orders of said indexing device before operation of said set up device, (g) means for rendering said zeroizing means ineffective upon setting up the first order of an amount, (h) and means operable by said mechanism for restoring said spring urged member and for causing said latch to relatch said spring urged member so restored irrespective of the return movement of said key.

10. In a calculating machine having a ten key keyboard, and a multiorder indexing device comprising in each order an element variably settable under the control of said keyboard, the combination comprising:

(a) a common member yieldably movable through a variable stroke for sequentially setting said settable element, (b) a set of stops variably located on said common member, (c) a set of counterstops associated with the keys of said keyboard and adapted to cooperate with said stops for controlling the stroke of said common member, one of said counterstops normally engaging the corresponding stop of said set for locking said common member in a zero position, the other counterstops being normally in an ineffective position for cooperating with the corresponding stops, (d) an operating mechanism adapted to be cyclically conditioned at the depression of each key of said keyboard for causing said common member to be so moved, (e) means operable by said mechanism for setting the counterstop associated to the depressed key in an effective position, (f) and means operable by said counterstop when so set for causing said normally engaging counterstop to disengage said corresponding stop.

11. In a calculating machine having a ten key keyboard, and a multiorder indexing device comprising in each order an element variably settable under the control of said keyboard, the combination comprising:

(a) a common member yieldably movable through a variable stroke for sequentially setting said settable element, (b) a set of stops variably located on said common member, (c) a set of counterstops associated with the keys of said keyboard and adapted to cooperate with said stops for controlling the stroke of said common member, one of said counterstops normally engaging the corresponding stop of said set for locking said common member in a zero position, the other counterstop being normally in an ineffective position for cooperating with the corresponding stops, (d) an operating mechanism adapted to be cyclically conditioned at the depression of each key of said keyboard for causing said common member to be so moved, (e) means operable by said mechanism for setting the counterstop associated to the depressed key in an effective position.

(f) normally effective zeroizing means operable by said mechanism for zeroizing said settable elements before movement of said common member, (g) and means for rendering said zeroizing means ineffective upon setting up the first order of an amount.

12. In a calculating machine having a ten key keyboard, a multiorder indexing device comprising in each order a gear variably settable under the control of said keyboard, a set of toothed actuators engageable with the set gears for reciprocating movement therewith, and a main operating mechanism, the combination comprising:

(a) a first universal bar drivable by said main mechanism for zeroizing said gears when engaging with said actuators for positively moving same through differential strokes, (b) and a second universal bar drivable by said main mechanism for restoring said actuators and returning said gears to their set positions.

13. In a calculating machine having a ten key keyboard, a multiorder indexing device comprising in each order a gear variably settable under the control of said keyboard, a set of toothed actuators engageable with the set gears for reciprocating movement therewith, and a main operating mechanism, the combination comprising:

(a) a set up device controlled by each key of said keyboard and operable for setting up each gear of said indexing device, (b) a set up operating mechanism adapted to be cyclically conditioned at the depression of each key of said keyboard for operating said set up device, (c) a universal bar drivable for zeroizing said gears, (d) zeroizing control means operable by said set up mechanism for driving said first universal bar before operation of said set up device, (e) and means for rendering said zeroizing control means effective when an operation of said main mechanism is effected and for rendering same ineffective when an operation of said set up device is effected.

14. In a calculating machine having a ten key keyboard, a multiorder indexing device comprising in each order a gear variably settable under the control of said keyboard, a set of toothed actuators engageable with the set gears for reciprocating movement therewith, and a main operating mechanism, the combination comprising:

(a) a set up device controlled by each key of said keyboard and operable for setting up each order of said indexing device, (b) a set up operating mechanism adapted to be cyclically conditioned at the depression of each key of said keyboard for operating said set up device, (c) a universal bar drivable for zeroizing said gears, (d) zeroizing control means operable by said set up mechanism for driving said first universal bar before operation of said set up device, (e) means for rendering said zeroizing control means effective when an operation of said main mechanism is effected and for rendering same ineffective when an operation of said set up device is effected, (f) a second universal bar drivable for restoring said actuators, (g) and means operable by said main mechanism for synchronously driving said first and said second universal bars when said gears engage said actuators for positively reciprocating said actuators and said gears.

15. In a calculating machine having a ten key keyboard, a multiorder indexing device adapted to be set order by order under the control of said keyboard, a set of actuators conditionable for differential movement under the control of said indexing device, and a main operating mechanism for cyclically conditioning said actuators, the combination comprising:

(a) a set up device controlled by each key of said keyboard and operable for setting up each order of said indexing device, (b) a set up operating mechanism adapted to be cyclically conditioned at the depression of each key of said keyboard for operating said set up device, (c) transversely traveling means for step by step changing the relationship between said indexing mechanism and said set of actuators, (d) yieldable means urging said traveling means toward their rest position, (e) a locking member normally effective for locking said traveling means against the action of said yieldable means, (f) a control element adapted to engage variably a toothed member according to the transverse position to be engaged of said traveling means, (g) a power operable clutch adapted to be engaged by said set up mechanism for advancing said traveling means against the urge of said yieldable means,
- (h) means operated by said set up mechanism for temporarily moving said control element perpendicular to the advancing direction of said toothed member to disengage said toothed member simultaneously with the engagement of said clutch,
- (i) and a disengaging member operable by said control element after one step of said traveling means for disengaging said clutch.

16. In a calculating machine having a ten key keyboard, a pair of multiorder transversely traveling set up carriages each one adapted to be set order by order under the control of said keyboard, a set of actuators conditionable for differential movement under the control of one of said carriages, and a main operating mechanism for cyclically conditioning said actuators, the combination comprising:
- (a) a set up device controlled by each key of said keyboard and operable for selectively setting up said carriages order by order,
- (b) a set up operating mechanism adapted to be cyclically conditioned at the depression of each key of said keyboard for operating said set up device,
- (c) a pair of zeroizing members each one associated with one of said carriages and selectively operable by said set up mechanism for zeroizing all orders of the corresponding carriage,
- (d) selecting means for selecting the carriage of said pair to be set up and to control said actuators, said selecting means being further adapted to select the corresponding member of said pair,
- (e) and means for rendering the selected member effective when an operation of said main mechanism is effected and for rendering same ineffective when an operation of said set up device is effected.

17. In a calculating machine having a ten key keyboard, a pair of multiorder transversely traveling set up carriages each one adapted to be set order by order under the control of said keyboard, a set of reciprocable actuating racks adapted to be selectively controlled by said carriages, and a main operating mechanism for reciprocating said racks, the combination comprising:
- (a) a gear variably settable on each order of each carriage of said pair for controlling said actuating racks,
- (b) means for mounting said carriages symmetrically at the opposite side of said actuating racks with respect to the reciprocating direction thereof,
- (c) a set up device controlled by each key of said keyboard and operable for selectively setting up said carriages order by order,
- (d) a set up operating mechanism adapted to be cyclically conditioned at the depression of each key of said keyboard for operating said set up device,
- (e) a pair of zeroizing members each one associated with one of said carriages and drivable by either said set up mechanism or said main mechanism for zeroizing all orders of the associated carriage,
- (f) and selecting means for selecting the carriage of said pair to be set up and to control said actuating racks, said selecting means being further adapted to select the corresponding member of said pair for being driven.

18. In a calculating machine having a ten key keyboard, a pair of multiorder transversely traveling set up carriages each one adapted to be set order by order under the control of said keyboard, a set of reciprocable actuating racks adapted to be selectively controlled by said carriages, and a main operating mechanism for reciprocating said racks, the combination comprising:
- (a) a gear element variably settable on each order of each carriage of said pair for controlling said actuating racks,
- (b) means for mounting said carriages symmetrically at the opposite side of said actuating racks with respect to the reciprocating direction thereof,
- (c) a set up device controlled by each key of said keyboard and operable for selectively setting up said carriages order by order,
- (d) a pair of zeroizing members each one associated with one of said carriages and drivable for zeroizing all orders of the corresponding carriage,
- (e) a common toothed member adapted to be selectively connected with said carriages,
- (f) a pair of control elements each one associated with one of said carriages and adapted to engage variably said toothed member according to the transverse position of the associated carriage,
- (g) zeroizing control means operable by said set up mechanism for selectively driving said pair of members before operation of said set up device,
- (h) disengaging means operable by said set up mechanism for selectively disengaging said pair of control elements from said toothed member,
- (i) means for rendering said zeroizing control means and said disengaging means effective when an operation of said main operating mechanism is effected and for rendering same ineffective when an operation of said set up device is effected,
- (j) and selecting means for selecting the carriage of said pair to be set up and to control said actuating racks, said selecting means being further adapted to select the corresponding member of said pair, and the corresponding control element of said pair.

References Cited by the Examiner
UNITED STATES PATENTS

| | | | |
|---|---|---|---|
| 1,557,457 | 10/1925 | Hawley | 235—62 X |
| 2,157,411 | 5/1939 | Hopkins | 235—79 |
| 2,636,677 | 4/1953 | Gang | 235—62 X |
| 2,733,010 | 1/1956 | Ellerbeck | 235—144 |
| 2,733,011 | 1/1956 | Davis | 235—144 |
| 2,758,789 | 8/1956 | Ellerbeck | 235—63 |
| 2,847,160 | 8/1958 | Hawthorne et al. | 235—63 |
| 2,946,505 | 7/1960 | Davis | 235—63 |
| 3,030,018 | 4/1962 | Ellerbeck | 235—145 |

STEPHEN J. TOMSKY, *Primary Examiner.*